(12) United States Patent
Seder et al.

(10) Patent No.: US 12,393,049 B2
(45) Date of Patent: Aug. 19, 2025

(54) ADAPTIVE INTERACTIVE CAMPFIRE DISPLAY

(71) Applicant: GM Global Technology Operations LLC, Detroit, MI (US)

(72) Inventors: Thomas A. Seder, Fraser, MI (US); Joseph F. Szczerba, Grand Blanc, MI (US); John P. Weiss, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 451 days.

(21) Appl. No.: 18/153,767

(22) Filed: Jan. 12, 2023

(65) Prior Publication Data
US 2024/0241389 A1    Jul. 18, 2024

(51) Int. Cl.
| | |
|---|---|
| G02B 30/56 | (2020.01) |
| B60R 11/02 | (2006.01) |
| B60R 11/04 | (2006.01) |
| G02B 27/00 | (2006.01) |
| G02B 30/31 | (2020.01) |
| G06F 3/01 | (2006.01) |
| B60R 11/00 | (2006.01) |
| G02B 27/14 | (2006.01) |
| G06F 3/041 | (2006.01) |

(52) U.S. Cl.
CPC .......... *G02B 30/31* (2020.01); *B60R 11/0229* (2013.01); *B60R 11/04* (2013.01); *G02B 27/0093* (2013.01); *G06F 3/012* (2013.01); *G06F 3/013* (2013.01); *G06F 3/017* (2013.01); *B60R 2011/0028* (2013.01); *B60R 2011/0029* (2013.01); *B60R 2011/0282* (2013.01); *G02B 27/14* (2013.01); *G06F 3/041* (2013.01)

(58) Field of Classification Search
CPC ......... G03B 21/26; G03B 21/62; G02B 30/56
USPC ......................................................... 359/443
See application file for complete search history.

(56) References Cited

U.S. PATENT DOCUMENTS

| | | | |
|---|---|---|---|
| 10,318,043 B2 | 6/2019 | Seder et al. | |
| 10,366,642 B2 * | 7/2019 | Reichow ................ | G09G 3/003 |
| 11,077,844 B2 | 8/2021 | Szczerba | |

(Continued)

OTHER PUBLICATIONS

U.S. Appl. No. 17/749,464 to Seder et al., filed May 20, 2022.
(Continued)

*Primary Examiner* — Audrey Y Chang
(74) *Attorney, Agent, or Firm* — Vivacqua Crane, PLLC

(57) ABSTRACT

A system for generating a floating three-dimensional image display within a vehicle includes an image chamber including a first display adapted to project a first image, a first reflector associated with the first display and a first passenger, a second display adapted to project a second image, and a second reflector associated with the second display and a second passenger, and a transparent display positioned between the first reflector and the first passenger, and between the second reflector and the second passenger, the first reflector adapted to reflect the first image from the first display to the first passenger, and the second reflector adapted to reflect the second image from the second display to the second passenger, and the transparent display adapted to display information to the first and second passengers within an image plane positioned in front of the perceived first and second images.

20 Claims, 4 Drawing Sheets

(56) References Cited

U.S. PATENT DOCUMENTS

| | | |
|---|---|---|
| 2010/0046050 A1 | 2/2010 | Kroll et al. |
| 2013/0100527 A1 | 4/2013 | Chung et al. |
| 2013/0321776 A1 | 12/2013 | Loong et al. |
| 2017/0322513 A1 | 11/2017 | Zapanta |
| 2018/0063520 A1* | 3/2018 | Chung ................ H04N 13/346 |
| 2018/0147985 A1 | 5/2018 | Brown et al. |
| 2019/0235375 A1* | 8/2019 | Martinez ............... G03B 21/10 |
| 2019/0243151 A1 | 8/2019 | Hansen |
| 2021/0023948 A1 | 1/2021 | Knittl et al. |
| 2022/0155614 A1* | 5/2022 | Kikuta ................. H04N 13/366 |
| 2023/0039608 A1 | 2/2023 | Ji et al. |
| 2023/0375829 A1 | 11/2023 | Seder et al. |

OTHER PUBLICATIONS

U.S. Appl. No. 17/746,243 to Chang et al., filed May 17, 2022.
U.S. Appl. No. 17/824,210 to Sharma et al., filed May 25, 2022.
U.S. Appl. No. 17/842,253 to Chang et al., filed Jun. 16, 2022.
U.S. Appl. No. 17/842,272 to Seder et al., filed Jun. 16, 2022.
U.S. Appl. No. 17/888,767 to Sharma et al., filed Aug. 16, 2022.

* cited by examiner

ADAPTIVE INTERACTIVE CAMPFIRE DISPLAY

INTRODUCTION

The present disclosure relates to a system for generating a floating image viewable by a plurality of passengers within a vehicle.

Current entertainment systems within vehicles generally comprise a screen or monitor that is mounted within the vehicle for viewing by the passengers. Some systems include smaller individual screens, wherein each passenger has a screen for their personal viewing. Current systems that provide virtual holographic images do not include the ability for annotation and for information that cannot be embedded within the virtual holographic image to be presented with the virtual holographic image. In addition, current systems do not include tactile properties that allow a passenger to interact with the virtual holographic image, such as by making selections or choosing different images to view. Known systems incorporate inverse head-up-display architectures that use beams splitters that must be attached to structure within the vehicle compartment and must be constantly re-adjusted to accommodate height and position variations of the passengers within the vehicle compartment.

While current systems achieve their intended purpose, there is a need for a new and improved system for providing a floating three-dimensional image that appears centrally located within the vehicle to all the passengers within the vehicle.

SUMMARY

According to several aspects of the present disclosure, a system for generating a centrally located floating three-dimensional image display for a plurality of passengers positioned within a vehicle includes an image chamber including a first display adapted to project a first image, a first reflector individually associated with the first display and a first one of the plurality of passengers, a second display adapted to project a second image, and a second reflector individually associated with the second display and a second one of the plurality of passengers, and a transparent display positioned between the first reflector and the first passenger, and between the second reflector and the second passenger, the first reflector adapted to receive the first image from the first display and to reflect the first image to the first passenger, wherein the first passenger perceives the first image floating at a central location within the image chamber, and the second reflector adapted to receive the second image from the second display and to reflect the second image to the second passenger, wherein the second passenger perceives the second image floating at the central location within the image chamber, and the transparent display adapted to display information to the first and second passengers within an image plane positioned in front of the perceived first and second images floating at the central location within the image chamber.

According to another aspect, the image chamber further includes a first transparent portion adapted to allow the first image reflected by the first reflector to pass from the image chamber outward toward the first passenger, a second transparent portion adapted to allow the second image reflected by the second reflector to pass from the image chamber outward toward the second passenger, and solid portions adapted to prevent light from entering the image chamber behind the first and second reflectors.

According to another aspect, the transparent display is a transparent touch screen positioned between eyes of the first passenger and the first image floating at the central location within the image chamber, between eyes of the second passenger and the second image floating at the central location within the image chamber, and adapted to allow the first and second passengers to provide input to the system.

According to another aspect, the transparent display includes a transparent cylindrical touch screen.

According to another aspect, the system is selectively moveable vertically up and down along a vertical central axis, the first display and the first reflector are unitarily and selectively rotatable about the vertical central axis, and the second display and the second reflector are unitarily and selectively rotatable about the vertical central axis.

According to another aspect, the system further includes first sensors adapted to monitor a position of a head and eyes of the first passenger, wherein, the first display and first reflector are adapted to rotate in response to movement of the head and eyes of the first passenger, and second sensors adapted to monitor a position of a head and eyes of the second passenger, wherein, the second display and the second reflector are adapted to rotate in response to movement of the head and eyes of the second passenger, the system adapted to move up and down along the vertical axis in response to movement of the head and eyes of the first passenger and movement of the head and eyes of the second passenger.

According to another aspect, the transparent display is an organic light-emitting diode.

According to another aspect, the system further includes a first gesture sensor adapted to gather information related to gestures made by the first passenger, and a second gesture sensor adapted to gather information related to gestures made by the second passenger, wherein, the system is adapted to receive input from the first and second passengers via data collected by the first and second gesture sensors.

According to another aspect, the system is mounted to and supported by one of a roof within the vehicle and a floor within the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
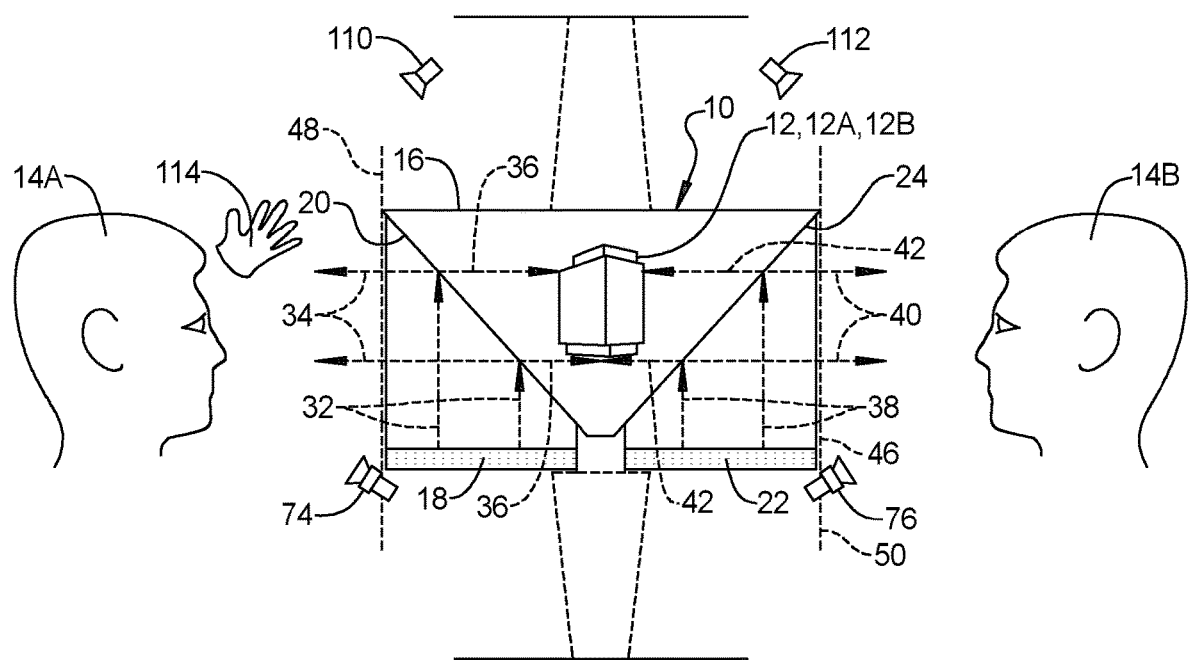
FIG. 1 is a schematic side view of a system in accordance with an exemplary embodiment of the present disclosure.

The figures are not necessarily to scale, and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Figure 2:
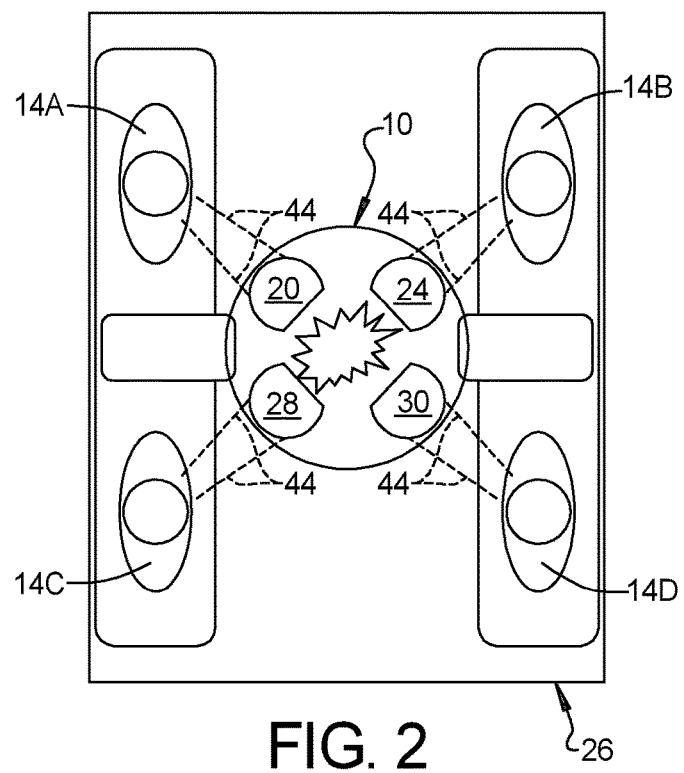
FIG. 2 is a schematic top view of a vehicle compartment having a system in accordance with an exemplary embodiment of the present disclosure.

Referring to FIG. 1 and FIG. 2, a system 10 for generating a centrally located floating three-dimensional image 12 display for a plurality of passengers 14 positioned within a vehicle, includes an image chamber 16 that includes a first display 18 that is adapted to project a first three-dimensional image 12A and a first reflector 20 individually associated with the first display 18 and a first one 14A of the plurality of passengers 14, and a second display 22 that is adapted to project a second three-dimensional image 12B and a second reflector 24 individually associated with the second display 22 and a second one 14B of the plurality of passengers 14. As shown in FIG. 1, the system 10 includes two displays 18, 22, reflectors 20, 24 and passengers 14A, 14B. It should be understood that the system 10 may be adapted to accommodate any suitable number of passengers 14.

Referring to FIG. 2, a vehicle compartment 26 includes a plurality of seating positions occupied by a plurality of passengers 14A, 14B, 14C, 14D. As shown, the vehicle compartment 26 includes four seating positions for four passengers 14A, 14B, 14C, 14D. Each reflector 20, 24, 28, 30 is adapted to be viewed by one of the passengers 14A, 14B, 14C, 14D. Each reflector 20, 24, 28, 30 is adapted to receive an image from the associated display 18, 22, and to reflect the image to the associated passenger 14. The associated passenger 14 perceives the image 12 floating at a central location within the image chamber 16. Referring again to FIG. 1, the first reflector 20 is adapted to receive the first image 12A from the first display 18, as indicated by arrows 32, and to reflect the first image 12A to the first passenger 14A, as indicated by arrows 34, wherein the first passenger 14A perceives the first image 12A floating at a central location within the image chamber 16, as indicated by arrows 36. The second reflector 24 is adapted to receive the second image 12B from the second display 22, as indicated by arrows 38, and to reflect the second image 12B to the second passenger 14B, as indicated by arrows 40, wherein, the second passenger 14B perceives the second image 12B floating at the central location within the image chamber 16, as indicated by arrows 42.

Referring to FIG. 2, each of the four passengers 14A, 14B, 14C, 14D perceives an image 12 reflected to them by respective associated reflectors 20, 24, 28, 30 and the passengers 14A, 14B, 14C, 14D perceive the image 12 reflected to them within the image chamber 16, as indicated by lines 44. Each of the displays 18, 22 can project the same image to each of the reflectors 20, 24, 28, 30 and thus to each of the passengers 14A, 14B, 14C, 14D. Alternatively, each of the displays 18, 22 can display a different perspective of the same image, or a different image altogether to each of the reflectors 20, 24, 28, 30. Thus the system 10 is capable of presenting the same floating image 12 to all the passengers 14 so they can view simultaneously, or alternatively, each passenger 14 can view a different perspective of the floating image 12 or a completely different three-dimensional image 12.

A transparent display 46 is positioned between the eyes of each of the plurality of passengers 14 and the reflectors 20, 24, 28, 30. As shown in FIG. 1, the transparent display 46 is positioned between the first reflector 20 and the first passenger 14A and between the second reflector 24 and the second passenger 14B. The transparent display 46 is adapted to display information to the first and second passengers 14A, 14B within an image plane positioned in front of the perceived first and second images 12A, 12B floating at the central location within the image chamber 16. The transparent display 46 presents information to the first passenger 14A that appears within a first image plane 48, wherein information displayed on the transparent display 46 to the first passenger 14A appears in front of the image 12A perceived by the first passenger 14A within the image chamber 16. The transparent display 46 presents information to the second passenger 14B that appears within a second image plane 50, wherein information displayed on the transparent display 46 to the second passenger 14B appears in front of the image 12B perceived by the second passenger 14B within the image chamber 16.

In an exemplary embodiment, the transparent display 46 is a transparent touch screen that is adapted to allow the plurality of passengers 14 to receive annotated information and to provide input to the system 10. Referring to FIG. 1 and FIG. 2, in an exemplary embodiment, the transparent display 46 includes a clear cylindrical touch screen. The clear cylindrical touch screen encircles the image chamber 16 and is thereby positioned between the eyes of the plurality of passengers 14 and the perceived image 12 floating at the central location within the image chamber 16.

In an exemplary embodiment, the transparent display 46 is an organic light-emitting diode (OLED). It should be understood, that the transparent display 46 may be other types of transparent touch screen displays known in the art.

The transparent display 46 is adapted to present visible displayed information only to the passenger 14 that is directly in front of a portion of the transparent display 46. The nature of the transparent display 46 is such that the displayed information is only displayed on a first side, the outward facing cylindrical surface, of the transparent display 46. A second side, the inward facing cylindrical surface, of the transparent display 46 does not display information, and thus, when viewed by the other passengers 14, allows the other passengers 14 to see through the transparent display 46.

In an exemplary embodiment, the images from each of the displays 18, 22 are generated via holographic method, pre-computed and encoded into a hologram generator within the display 18, 22. In an exemplary embodiment, each display 18, 22 is adapted to project a three-dimensional image with variable virtual image distance. Three-dimensional images with variable virtual image distance allows the system 10 to project a floating image 12 to the passengers 14 with the capability of making the floating image 12 appear closer or further away from the passengers 14.

Referring again to FIG. 1, in an exemplary embodiment, the system is mounted to a support structure suspended from a roof 28 within the vehicle compartment 20. Alternatively, in another exemplary embodiment, the system is mounted to a support structure, such as a pedestal, mounted to a floor 30 within the vehicle compartment 20. In various embodiments, the system bay be retractable, wherein, when not in use, the system recesses within the roof or the floor within the vehicle compartment.

The transparent display 46 and each of the reflectors 20, 24, 28, 30 are transparent, wherein a passenger 14 can see through the transparent display 46 and an associated reflector 20, 24, 28, 30. This allows the passenger 14 to perceive the floating image 12 at a distance beyond the reflector 20, 24, 28, 30 and further, allows the passenger 14 to see through the transparent display 46 and the reflectors 20, 24, 28, 30 and able to see the interior of the vehicle compartment 26 and other passengers 14 therein.

In one exemplary embodiment, the transparent display 46 is an autostereoscopic display that is adapted to display stereoscopic, or three-dimensional images by adding binocular perception of three-dimensional depth without the use of special headgear, glasses, something that affects the viewer's vision, or anything for the viewer's eyes. Because headgear is not required, autostereoscopic displays are also referred to as "glasses-free 3D" or "glassesless 3D". The autostereoscopic transparent display includes a display panel and a parallax barrier mounted to the display panel, on an outwardly facing side of the display panel facing an associated one of the plurality of passengers 14. In an exemplary embodiment the parallax barrier that is mounted onto the transparent display 46 includes a plurality of parallel, vertical apertures, that divide the image displayed such that a left eye and a right eye of a passenger 14 viewing the autostereoscopic display see different portions of the displayed image and the passenger 14 perceives a three-dimensional image.

In an exemplary embodiment, the parallax barrier that is mounted onto the transparent display 46 is selectively actuatable by a controller adapted to switch between having the parallax barrier off, wherein the parallax barrier is completely transparent, and the viewing passenger 14 sees images displayed on the transparent display 46 as two-dimensional images, and having the parallax barrier on, wherein the viewing passenger 14 sees the images displayed on the transparent display 46 as a three-dimensional images.

When the parallax barrier is actuated, each of the left and right eyes of the viewing passenger 14 only see half of the displayed image, therefore, the resolution of the three-dimensional image is reduced. To improve resolution, in one exemplary embodiment, the controller is configured to implement time-multiplexing by alternately turning the parallax barrier on and off. Time-multiplexing requires the system 10 to be capable of switching the parallax barrier on and off fast enough to eliminate any perceptible image flicker by the viewing passenger 14. Liquid crystal displays are particularly suitable for such an application.

Figure 3:
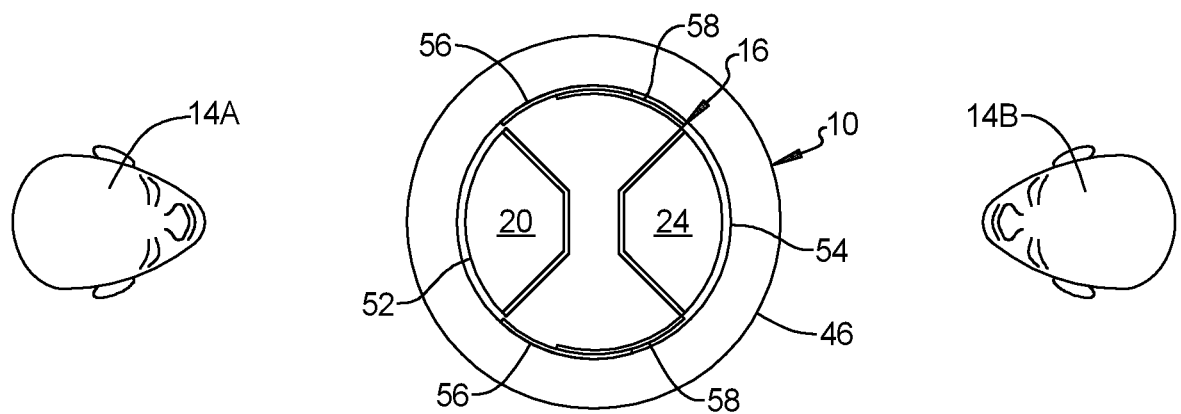
FIG. 3 is a schematic top view of the system shown in FIG. 1 with a first and second passenger.

Referring to FIG. 3, the image chamber 16 includes transparent portions 52, 54 to allow the passengers 14 to see their associated reflector 20, 24, 28, 30. As shown, the image chamber 16 includes a first transparent portion 52 that is adapted to allow the first image 12A reflected by the first reflector 20 to pass from the image chamber 16 outward toward the first passenger 14A, as indicated by arrows 34 in FIG. 1. Further, the image chamber 16 includes a second transparent portion 54 that is adapted to allow the second image 14B reflected by the second reflector 24 to pass from the image chamber 16 outward toward the second passenger 14B, as indicated by arrows 40 in FIG. 1.

The image chamber 16 further includes solid portions 56, 58 that are adapted to prevent light from entering the image chamber 16 behind the first and second reflectors 20, 24. The image chamber 16 functions much like a Pepper's Ghost Chamber, wherein the image of an object is perceived by a viewer within a reflective surface adjacent the actual image. As discussed above, in the present disclosure, the image presented by a display 18, 22 which is not within view of a passenger 14, is reflected by a reflector 20, 24, 28, 30 to the passenger 14A, 14B, 14C, 14D such that the passenger "sees" the image within the image chamber 16 and perceives the image 12 to be floating behind the reflective surface of the reflector 20, 24, 28, 30. If the image chamber 16 behind the reflectors 20, 24, 28, 30 is exposed to ambient light, the image will not be viewable by the passengers 14. Thus, solid portions 56, 58 of the image chamber 16 are adapted to prevent light from entering the image chamber 16 behind the first and second reflectors 20, 24. Referring to FIG. 3, the image chamber 16 includes solid overlapping panels 56, 58 that are adapted to prevent light from entering the image chamber 16 behind the first and second reflectors 20, 24.

Figure 4:
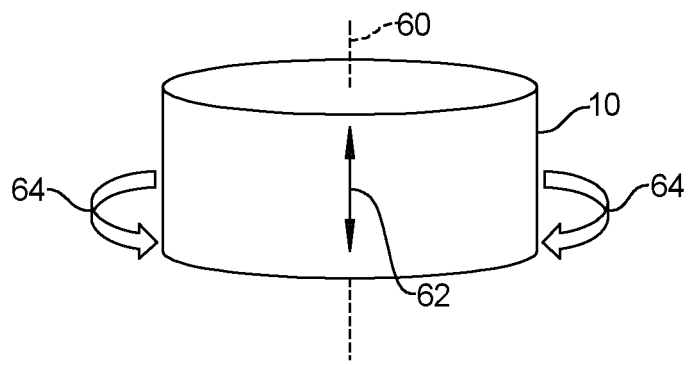
FIG. 4 is a schematic perspective view of the system shown in FIG. 1.

Referring to FIG. 4, in an exemplary embodiment, the system 10 is selectively moveable vertically up and down along a vertical central axis 60, as indicated by arrow 62. Further, each display 18, 22 and the associated reflector 20, 24, 28, 30 are unitarily and selectively rotatable about the vertical central axis 60, as shown by arrows 64. This allows the system 10 to adjust to varying locations of the passengers 14 within the vehicle compartment 26.

Figure 5:
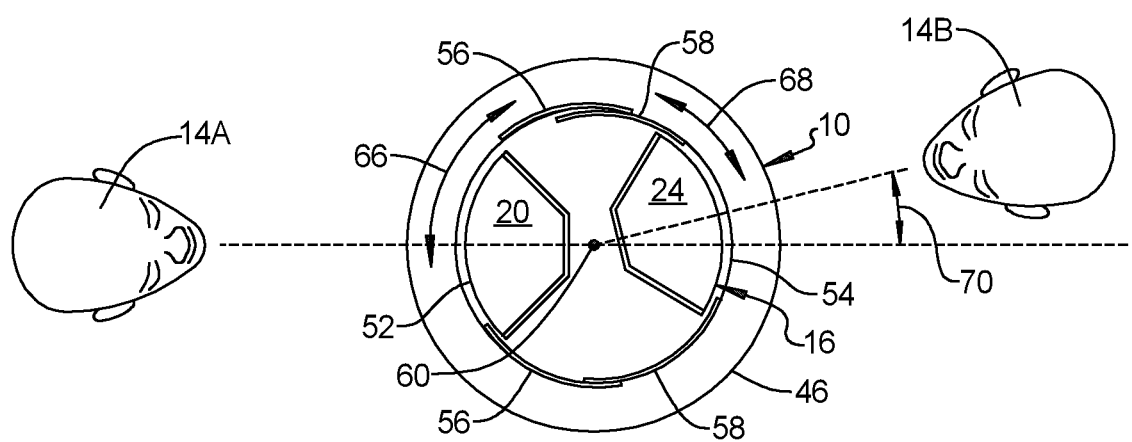
FIG. 5 is a schematic top view of the system shown in FIG. 3, wherein the position of the second passenger has moved.

Referring to FIG. 5, the fist reflector 20 and the first display 18 are rotatable about the vertical central axis 60, as indicated by arrow 66. The second reflector 24 and the second display 22 are rotatable about the vertical central axis 60, as indicated by arrow 68. As shown in FIG. 3, the first and second passengers 14A, 14B are sitting directly across from one another, and the first reflector 20 and first display 18 are positioned 180 degrees from the second reflector 24 and second display 22. As shown in FIG. 5, the position of the head of the second passenger 14B has moved, and the second reflector 24 and the second display 22 have been rotated an angular distance 70 to ensure the second passenger 14B perceives the image 12 from the second display 22 and the second reflector 24.

In an exemplary embodiment, the image chamber 16 includes first solid panels 56 positioned adjacent the first reflector 20 on either side and adapted to move unitarily with the first reflector 20 and the first display 18 as the first reflector 20 and the first display 18 rotate about the vertical central axis 60. Second solid panels 58 are positioned adjacent the second reflector 24 on either side and are adapted to move unitarily with the second reflector 24 and the second display 22 as the second reflector 24 and the second display 22 rotate about the vertical central axis 60. The first solid panels 56 overlap the second solid panels 58 to allow relative movement of the first solid panels 56 relative to the second solid panels 58 and to ensure that ambient light is blocked from entering the image chamber 16 behind the first and second reflectors 20, 24 at all times.

In an exemplary embodiment, each of the displays 18, 22 and associated reflectors 20, 24, 28, 30 are equipped with head tracking capability, wherein an orientation of each display 18, 22 and associated reflector 20, 24, 28, 30 changes automatically in response to movement of a head and eyes of a passenger 14 detected by a monitoring system 72. Monitoring systems 72 within a vehicle include sensors 74 that monitor head and eye movement of a driver/passenger within the vehicle.

In an exemplary embodiment, the system 10 includes first sensors 74 adapted to monitor a position of a head and eyes of the first passenger 14A. The first sensors 74 may include camera and motion sensors adapted to detect the position and movement of the first passenger's head and eyes. As shown, the first sensors 74 include a camera oriented to monitor the position and movement of the head and eyes of the first passenger 14A. The first display 18 and first reflector 20 are adapted to rotate in response to movement of the head and eyes of the first passenger 14A. The system 10 further includes second sensors 76 adapted to monitor a position of a head and eyes of the second passenger 14B. The second sensors 76 may include camera and motion sensors adapted to detect the position and movement of a passenger's head and eyes. As shown, the second sensors 76 include a camera oriented to monitor the position and movement of the head and eyes of the second passenger 14B. The second display 22 and second reflector 24 are adapted to rotate about the vertical central axis 60 in response to movement of the head and eyes of the second passenger 14B.

Figure 6:
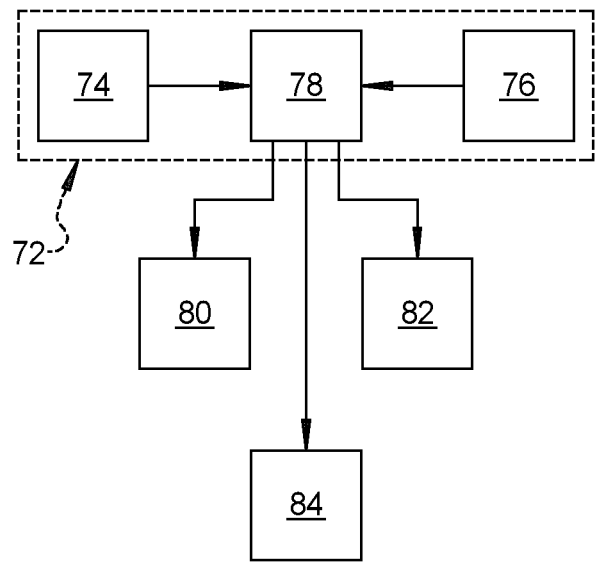
FIG. 6 is a schematic view of a monitoring system and first, second and third motors for moving the system.

Referring to FIG. 6, a controller 78 of the monitoring system 72 receives information from the first sensors 74, and in response to detection of head/eye movement by the first passenger 14A, actuates a first motor 80 adapted to rotate the first reflector 20 and first display 18 about the vertical central axis 60. Further, the controller 78 of the monitoring system 72 receives information from the second sensors 76, and in response to detection of head/eye movement by the second passenger 14B, actuates a second motor 82 adapted to rotate the second reflector 24 and second display 22 about the vertical central axis 60.

The controller 78 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

In addition to rotation of the first display 18 and first reflector 20 and the second display 22 and second reflector 24, the system 10 is adapted to move up and down along the vertical central axis 60 in response to movement of the head and eyes of the first passenger 14A and movement of the head and eyes of the second passenger 14B. The controller 78 of the monitoring system 72 receives information from the first sensors 74 and the second sensors 76, and in response to detection of head/eye movement by the first and second passengers 14A, 14B, actuates a third motor 84 adapted to raise and lower the system 10 along the vertical central axis 60 to maintain optimal vertical position of the system 10 relative to the passengers 14. Preferences may be set within the system 10 such that the system 10 maintains optimal vertical positioning relative to a designated one of the plurality of passengers 14, or alternatively, preferences can be set such that the system 10 maintains a vertical position taking into consideration some or all of the plurality of passengers 14.

In an exemplary embodiment, the monitoring system 72 is adapted to monitor the position of a head and eyes of each one of the plurality of passengers 14, wherein, for each of the plurality of passengers 14, the system 10 is adapted to display information at a specific location on the transparent display 46 based on a position of the head and eyes of the passenger 14. In another exemplary embodiment, for each of the plurality of passengers 14, the system 10 is adapted to display information at a specific location on the transparent display 46 based on the position of the head and eyes of the passenger 14 relative to the perceived image 12 within the image chamber 16, such that, for each of the plurality of passengers 14, information displayed on the transparent display 46 is properly positioned relative to the perceived image 12 within the image chamber 16.

Figure 7:
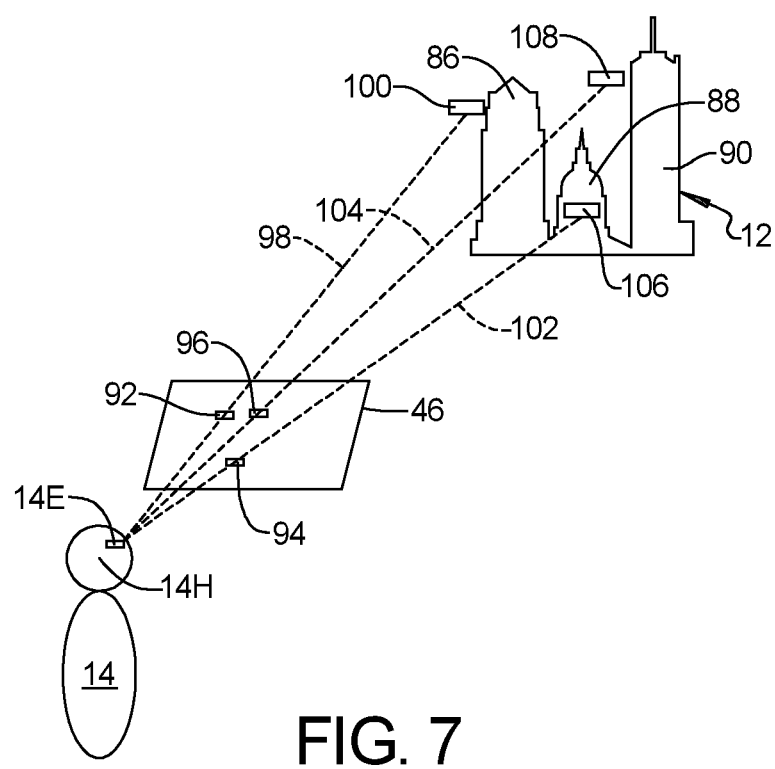
FIG. 7 is a schematic view illustrating a passenger viewing an image and annotation information through an associated beam splitter and passenger interface.

Referring to FIG. 7, in a schematic view of a passenger 14 an associated transparent display 46 and a floating image 12, the passenger 14 perceives the floating image 12 at a distance behind the transparent display 46. The transparent display 46 displays information related to the floating image 12 at a proper location on the transparent display 46 so the passenger 14 sees the information at a proper location relative to the floating image 12. As shown in FIG. 7, the floating image 12 is of a skyline, and more specifically, of three buildings, a first building 86, a second building 88, and a third building 90. The transparent display 46 displays first building information 92, second building information 94 and third building information 96.

The first building information 92 appears in a text box and may contain information about the first building 86 as well as the option of allowing the passenger 14 to touch the first building information 92 text box to acquire additional information about the first building 86. For example, the first building information 92 text box may contain the name of the first building 86 and the street address. The passenger 14 may opt to touch the first building information 92 text box, wherein additional information will appear on the transparent display 46, such as the date the first building 86 was built, what type of building (office, church, arena, etc.), or statistics such as height, capacity, etc. The second building information 94 and the third building information 96 also appear in text boxes that contain similar information and the option for the passenger 14 to touch the second or third building information 94, 96 text boxes to receive additional information about the second and third buildings 88, 90.

The monitoring system 72 tracks the position of the passenger's 14 head 14H and eyes 14E and positions the first, second and third building information 92, 94, 96 text boxes at a location on the transparent display 46, such that when the passenger 14 looks at the floating image 12 through the reflector 20, 24, 28, 30 and the transparent display 46, the passenger 14 sees the first, second and third building information 92, 94, 96 text boxes at the proper locations relative to the floating image 12. For example, the transparent display 46 positions the first building information 92 in the passenger's line of sight, as indicated by dashed line 98, such that the first building information 92 is perceived by the passenger 14 at a location immediately adjacent the first building 86, as indicated at 100. Correspondingly, the transparent display positions the second building information 94 in the passenger's line of sight, as indicated by dashed line 102, and the third building information 96 in the passenger's line of sight, as indicated by dashed line 104, such that the second and third building information 94, 96 is perceived by the passenger 14 at a location superimposed on the building, in the case of the second building 88, as indicated at 106, and at a location immediately adjacent the building, in the case of the third building 90, as indicated at 108.

The monitoring system 72 continuously tracks movement of the head 14H and eyes 14E of the passenger 14 and adjusts the position that the first, second and third building information 92, 94, 96 are displayed on the transparent display 46 to ensure that the passenger 14 always perceives the first, second and third building information 92, 94, 96 at the proper locations 100, 106, 108 relative to the floating image 12.

In an exemplary embodiment, the system 10 is adapted to accept input from a passenger 14 based solely on contact between the passenger 14 and the transparent display 46. For example, when a passenger 14 reaches out to touch a finger-tip to the transparent display 46, the transparent display 46 takes the input based solely on the point of contact between the tip of the finger of the passenger 14 and the transparent display 46.

In another exemplary embodiment, the system 10 is adapted to accept input from a passenger 14 based on contact between the passenger 14 and the transparent display 46 and based on the location of a point of contact between the passenger 14 and the transparent display 46 relative to the perceived image 12. For example, the monitoring system 72 tracks the movement and position of the passenger's 14 eyes 14E and head 14H. The transparent display 46 displays information that is perceived by the passenger 14 relative to the floating image 12, as discussed above. When the passenger 14 touches the transparent display 46, the passenger 14 perceives that they are touching the floating image 12. The system 10 uses parallax compensation to correlate the actual point of contact between the finger-tip of the passenger 14 on the transparent display 46 to the location on the floating image 12 that the passenger 14 perceives they are touching.

The system 10 may display, on the transparent display 46, multiple different blocks of annotated information relative to a floating image 12. As the passenger's 14 head 14H and eyes 14E move, the passenger's head 14H and eyes 14E will be positioned at a different distance and angle relative to the transparent display 46, thus changing the perceived location of displayed information relative to the image 12. By using parallax compensation techniques, such as disclosed in U.S. Pat. No. 10,318,043 to Seder, et al., hereby incorporated by reference herein, the system 10 ensures that when the passenger 14 touches the transparent display 46, the system 10 correctly identifies the intended piece of annotated information that the passenger 14 is selecting.

In another exemplary embodiment, the system 10 is adapted to accept input from a passenger 14 based on gestures made by the passenger 14 where the passenger 14 does not touch the transparent display 46. For example, when the passenger 14 moves a hand, or points to an object that is displayed on the transparent display 46 or to an object within the vehicle compartment 26 or outside of the vehicle compartment 26.

Referring again to FIG. 1, in an exemplary embodiment, the system includes a first gesture sensor 110 adapted to monitor position and movement of arms, hands and fingers 114 of the first passenger 14A and to gather data related to gestures made by the first passenger 14A. The first gesture sensor 110 may include a camera and motion sensors adapted to detect the position and movement of the first passenger's arms, hands and fingers. As shown, the first gesture sensor 110 includes a camera oriented to monitor the position and movement of the arms, hands and fingers of the first passenger 14A. Further, the system 10 includes a second gesture sensor 112 adapted to monitor position and movement of arms, hands and fingers of the second passenger 14B and to gather data related to gestures made by the second passenger 14B. The second gesture sensor 112 may include a camera and motion sensors adapted to detect the position and movement of the second passenger's arms, hands and fingers. As shown, the second gesture sensor 112 includes a camera oriented to monitor the position and movement of the arms, hands and fingers of the second passenger 14B.

The system 10 uses data collected by the first and second gesture sensors 110, 112 to identify gestures made by the passengers 14A, 14B within the vehicle compartment 26. A system controller will use computer learning algorithms and parallax compensation techniques to interpret such gestures and identify input data, such as when a passenger 14 is pointing to an object outside the vehicle compartment 26.

Figure 8:
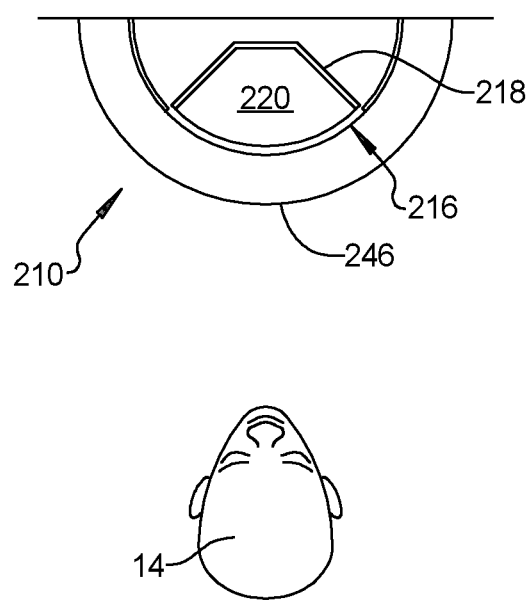
FIG. 8 is a top schematic view of a system in accordance with the present disclosure adapted for use by a single passenger.

As mentioned, a system 10 in accordance with the present disclosure may be adapted to accommodate any suitable number of passengers 14. Referring to FIG. 8, a system 210 is shown wherein an image chamber 216 includes a display 218 and reflector 220 adapted to provide a displayed image within the image chamber 216 for a single passenger 14. The image chamber 216 and a transparent display 246 of the system 210 are semi-circle shaped.

A system of the present disclosure offers several advantages. These include providing a floating image that is perceived by the passengers at a centrally location position within the vehicle compartment. This provides a camp-fire like viewing atmosphere where the passengers can all view a common floating image, or each passenger can view a unique floating image. Further, a system in accordance with the present disclosure provides the ability to display annotations and information not embedded within the virtual image and to ensure such annotations and information are perceived by a passenger at a proper location relative to the virtual image and in a plane between the passenger and the floating image. The system also allows a passenger to interact with the virtual image via the touch screen passenger interface and uses parallax compensation to ensure the system correctly correlates passenger input via the passenger interface to annotations and information displayed along with the virtual image.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for generating a centrally located floating three-dimensional image display for at least one passenger positioned within a vehicle, comprising:
    an image chamber including:
        at least one display adapted to project an image; and
        at least one reflector, one of the at least one reflector individually associated with each one of the at least one display and one of the at least one passenger; and
    a transparent touch screen display positioned between the at least one reflector and the at least one passenger and adapted to allow the at least one passenger to provide input to the system;
    each of the at least one reflector adapted to receive an image from the associated one of the at least one display and to reflect the image to the associated one of the at least one passenger, wherein, the associated one of the at least one passenger perceives the image floating at a central location within the vehicle; and
    the transparent touch screen display adapted to:
        display information to the at least one passenger within an image plane positioned in front of the perceived image floating at the central location within the vehicle;
        accept input from the at least one passenger based on a location of a point of contact between the at least one passenger and the transparent touch screen display relative to the perceived image floating at the central location within the vehicle; and
        correlate, using parallax compensation, an actual point of contact between the at least one passenger and the transparent touch screen display to a location on the perceived image floating at the central location within the vehicle that the at least one passenger perceives they are touching.

2. The system of claim 1, wherein the image chamber further includes:
    transparent portions adapted to allow the image reflected by each of the at least one reflector to pass from the image chamber outward toward the associated one of the at least one passenger; and
    solid portions adapted to prevent light from entering the image chamber behind the at least one reflector.

3. The system of claim 1, wherein the transparent touch screen display is positioned between the eyes of the at least one passenger and the perceived image floating at the central location within the vehicle.

4. The system of claim 1, wherein the system is selectively moveable vertically up and down along a vertical central axis, and each of the at least one display and the associated one of the at least one reflector are selectively rotatable about the vertical central axis.

5. The system of claim 4, further including sensors adapted to monitor a position of a head and eyes of each of the at least one passenger, wherein the system is adapted to move up and down along the vertical central axis in response to movement of the head and eyes of the associated one of the at least one passenger, and each of the at least one display and the associated one of the at least one reflector are adapted to rotate in response to movement of the head and eyes of the associated one of the at least one passenger.

6. The system of claim 1, wherein the transparent touch screen display is an organic light-emitting diode.

7. The system of claim 1, further including at least one gesture sensor adapted to gather information related to gestures made by the at least one passenger, wherein, the system is adapted to receive input from the at least one passenger via data collected by the at least one gesture sensor.

8. The system of claim 1, wherein the system is mounted to and supported by one of a roof within the vehicle and a floor within the vehicle.

9. The system of claim 1, wherein the transparent touch screen display is a beam splitter.

10. A system for generating a centrally located floating three-dimensional image display for a plurality of passengers positioned within a vehicle, comprising:
    an image chamber including:
        a first display adapted to project a first image;
        a first reflector individually associated with the first display and a first one of the plurality of passengers;
        a second display adapted to project a second image; and
        a second reflector individually associated with the second display and a second one of the plurality of passengers; and
    a transparent touch screen display positioned between the first reflector and the first passenger, and between the second reflector and the second passenger and adapted to allow the first and second passengers to provide input to the system;
    the first reflector adapted to receive the first image from the first display and to reflect the first image to the first passenger, wherein the first passenger perceives the first image floating at a central location within the image chamber, and the second reflector adapted to receive the second image from the second display and to reflect the second image to the second passenger, wherein, the second passenger perceives the second image floating at the central location within the image chamber; and
    the transparent touch screen display adapted to:
        display information to the first and second passengers within an image plane positioned in front of the perceived first and second images floating at the central location within the image chamber;
        accept input from one of the first and second passengers based on a location of a point of contact between the one of the first and second passengers and the transparent touch screen display relative to the perceived image floating at the central location within the image chamber; and
        correlate, using parallax compensation, an actual point of contact between the one of the first and second passengers and the transparent touch screen display to a location on the perceived image floating at the central location within the image chamber that the one of the first and second passengers perceives they are touching.

11. The system of claim 10, wherein the image chamber further includes:
    a first transparent portion adapted to allow the first image reflected by the first reflector to pass from the image chamber outward toward the first passenger;

a second transparent portion adapted to allow the second image reflected by the second reflector to pass from the image chamber outward toward the second passenger; and solid portions adapted to prevent light from entering the image chamber behind the first and second reflectors.

12. The system of claim 10, wherein the transparent touch screen display is positioned between eyes of the first passenger and the first image floating at the central location within the image chamber, and between eyes of the second passenger and the second image floating at the central location within the image chamber.

13. The system of claim 12, wherein the transparent touch screen display includes a transparent cylindrical touch screen.

14. The system of claim 10, wherein the system is selectively moveable vertically up and down along a vertical central axis, the first display and the first reflector are unitarily and selectively rotatable about the vertical central axis, and the second display and the second reflector are unitarily and selectively rotatable about the vertical central axis.

15. The system of claim 14, further including first sensors adapted to monitor a position of a head and eyes of the first passenger, wherein, the first display and first reflector are adapted to rotate in response to movement of the head and eyes of the first passenger, and second sensors adapted to monitor a position of a head and eyes of the second passenger, wherein, the second display and the second reflector are adapted to rotate in response to movement of the head and eyes of the second passenger, the system adapted to move up and down along the vertical axis in response to movement of the head and eyes of the first passenger and movement of the head and eyes of the second passenger.

16. The system of claim 10, wherein the transparent touch screen display is an organic light-emitting diode.

17. The system of claim 10, further including a first gesture sensor adapted to gather information related to gestures made by the first passenger, and a second gesture sensor adapted to gather information related to gestures made by the second passenger, wherein, the system is adapted to receive input from the first and second passengers via data collected by the first and second gesture sensors.

18. The system of claim 10, wherein the system is mounted to and supported by one of a roof within the vehicle and a floor within the vehicle.

19. A system for generating a centrally located floating three-dimensional image display for a plurality of passengers positioned within a vehicle, comprising:
an image chamber including:
a first display adapted to project a first image;
a first reflector individually associated with the first display and a first one of the plurality of passengers;
a first transparent portion adapted to allow the first image reflected by the first reflector to pass from the image chamber outward toward the first passenger;
a second display adapted to project a second image; and
a second reflector individually associated with the second display and a second one of the plurality of passengers;
a second transparent portion adapted to allow the second image reflected by the second reflector to pass from the image chamber outward toward the second passenger; and solid portions adapted to prevent light from entering the image chamber behind the first and second reflectors; and a transparent touch screen display positioned between eyes of the first passenger and the first reflector, and between eyes of the second passenger and the second reflector and adapted to allow the first and second passengers to provide input to the system;

the first reflector adapted to receive the first image from the first display and to reflect the first image to the first passenger, wherein the first passenger perceives the first image floating at a central location within the image chamber, and the second reflector adapted to receive the second image from the second display and to reflect the second image to the second passenger, wherein, the second passenger perceives the second image floating at the central location within the image chamber; and the transparent touch screen display adapted to:
display information to the first and second passengers within an image plane positioned in front of the perceived first and second images floating at the central location within the image chamber;
accept input from one of the first and second passengers based on a location of a point of contact between the one of the first and second passengers and the transparent touch screen display relative to the perceived image floating at the central location within the image chamber; and
correlate, using parallax compensation, an actual point of contact between the one of the first and second passengers and the transparent touch screen display to a location on the perceived image floating at the central location within the image chamber that the one of the first and second passengers perceives they are touching.

20. The system of claim 19, wherein the system is selectively moveable vertically up and down along a vertical central axis, the first display and the first reflector are unitarily and selectively rotatable about the vertical central axis, and the second display and the second reflector are unitarily and selectively rotatable about the vertical central axis;

the system further including:
first sensors adapted to monitor a position of a head and eyes of the first passenger, wherein, the first display and first reflector are adapted to rotate in response to movement of the head and eyes of the first passenger, and second sensors adapted to monitor a position of a head and eyes of the second passenger, wherein, the second display and the second reflector are adapted to rotate in response to movement of the head and eyes of the second passenger, the system adapted to move up and down along the vertical axis in response to movement of the head and eyes of the first passenger and movement of the head and eyes of the second passenger; and
a first gesture sensor adapted to gather information related to gestures made by the first passenger, and a second gesture sensor adapted to gather information related to gestures made by the second passenger, wherein, the system is adapted to receive input from the first and second passengers via data collected by the first and second gesture sensors.

* * * * *